H. E. POND.

Assignor to R. E. DIETZ,

Signal-Lantern.

No. 8,457. Reissued Oct. 15, 1878.

*Witnesses:*

Henry Eichling

A. R. Page

*Inventor:*

Henry E. Pond per James A. Whitney Atty.

N. PETERS, PHOTO-LITHOGRAPHER, WASHINGTON, D. C.

UNITED STATES PATENT OFFICE.

HENRY E. POND, OF FRANKLIN, MASSACHUSETTS, ASSIGNOR TO ROBERT E. DIETZ, OF NEW YORK CITY.

IMPROVEMENT IN SIGNAL-LANTERNS.

Specification forming part of Letters Patent No. 188,671, dated March 20, 1877; Reissue No. 8,457, dated October 15, 1878; application filed June 27, 1878.

*To all whom it may concern:*

Be it known that I, HENRY E. POND, of Franklin, Norfolk county, Massachusetts, have invented certain Improvements in Railway Hand-Lanterns, of which the following is a specification:

These improvements relate to hand-lanterns for railway service, for use as signal-lights, or, when occasion requires, for ordinary illuminating purposes; and the said invention consists in the introduction of several features of novelty and utility, as hereinafter explained.

Figure 1:
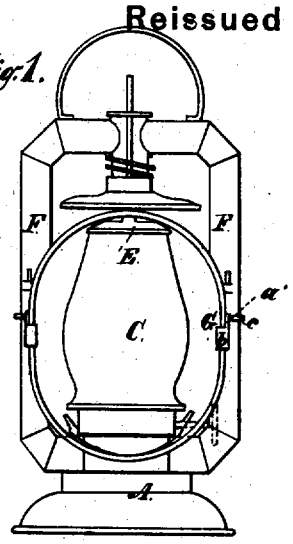
Figure 2:
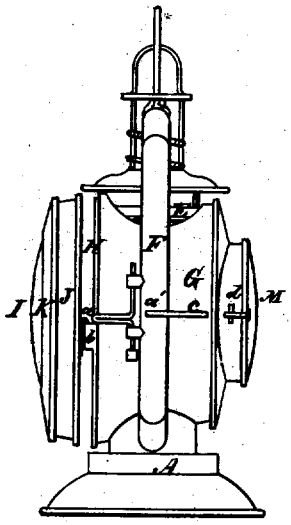
Figure 3:
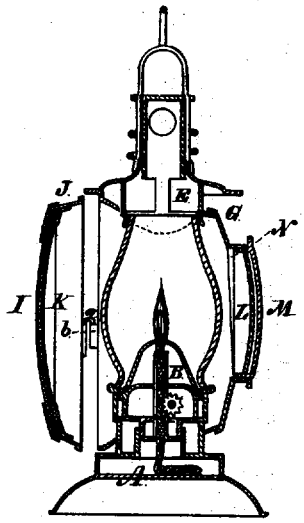

The drawings accompanying this specification represent in Figure 1 a front view, in Fig. 2 a side view, and in Fig. 3 a vertical section, of a lantern containing my improvements.

In these drawings, A represents the base and lamp of a kerosene-lantern; B, the burner thereof; C, the chimney of such burner; E, the adjustable cap or support for maintaining the chimney in an erect position; and F, the air-tube which surrounds the chimney, and connects with the latter and the base of the burner, such elementary features of a lantern being the same as now generally in use.

In carrying out my improvements, I surround the lamp burner and chimney with a hood, G, which is open at one side only, as shown at H, and this open side, when an ordinary lantern is desired, is to be covered or inclosed by a window of plain glass or mica; and when a signal is to be displayed the plain window is to be replaced by a colored one of any character. For this reason I provide several windows of different colors, any one of which may be secured to the lantern. One of these windows is shown at I in the drawings as composed of an annular frame, J, inclosing a transparent pane, K, the frame being provided with hooks *a a* to take into eyes *b b*, secured to opposite sides of the hood, by which means the window may be readily applied and removed. Upon each side of the hood G, and at its rear part, I affix another pair of eyes, *c c*, to receive the hooks of the window-frame, by which means I am enabled to carry with the lantern two windows—a plain and a colored one; and when one is in use in front of the hood the other is stowed away at the back, the two being interchangeable and always at hand.

The rear of the hood constitutes a reflector, L, to direct the rays of light forward through the window, while the sides of the hood, which are or may be reflecting-surfaces, serve to prevent lateral spreading and loss of rays of light, and throw them forward through the window with very beneficial results. In order to readily polish the reflector L, or to renew it in case of breakage or injury, I apply it in a removable manner—that is to say, I place it within a frame or cap-plate, M, and I secure this cap-plate about an opening, N, in the rear of the hood by means of hooks and eyes *d d*, which enable the removal of the reflector to be easily and expeditiously effected.

In order to collect and discharge the rays of light from the inflamed wick in the most effective manner, I increase the height of the burner or of the wick-tube of the latter, with respect to the center of the reflector, as shown in the drawings—that is to say, so that the bulk of the flame shall stand about on a level with or slightly above such center, as I find this relative position of the parts to impart the greatest amount of light.

It will be seen that the hood G is independent of the remainder of the lantern, and confined to the latter by suitable latches or clasps *a′ a′*. By removing the hood an ordinary lantern is left.

To produce a cheap as well as effective colored window-pane, I employ two sheets of gelatine, of any desired color—red, for instance—placed together, with a piece of tarlatan or crape of the same color interposed between them, a thin solution of gum-arabic or other transparent gum being laid upon their inner surfaces to cause them to adhere, and the whole being subjected to suitable pressure. The outer surfaces of the pane thus made are subsequently varnished to protect against moisture.

I claim—

1. The hood open at one side only, for the attachment and detachment of a removable signal-pane, in combination with a lantern, substantially as and for the purpose herein set forth.

2. In hand-lanterns containing the lamp, draft-tube, and adjustable chimney-support, substantially as described, the hood G, surrounding the burner and chimney, essentially as and for the purpose stated.

3. The combination, with the lantern proper, of the removable hood G and one or more windows detachably connected with the hood, so that one window may be removed and replaced by another, substantially as and for the purposes set forth.

4. A window-pane for hand-lanterns constructed as follows: consisting of the two sheets of gelatine, with the interposed material, cemented together, and varnished, essentially as and for purposes described.

HENRY E. POND.

Witnesses:
H. WELLS, Jr.,
A. R. PAGE.